(No Model.)

E. F. HASKELL.

STRAINER FOR TEA AND COFFEE POTS.

No. 286,813. Patented Oct. 16, 1883.

WITNESSES
F. L. Ouraud
N. E. Oliphant

INVENTOR
Elbridge F. Haskell,
per Chas. H. Fowler
Attorney

UNITED STATES PATENT OFFICE.

ELBRIDGE F. HASKELL, OF LAWRENCE, MASSACHUSETTS.

STRAINER FOR TEA AND COFFEE POTS.

SPECIFICATION forming part of Letters Patent No. 286,813, dated October 16, 1883.

Application filed May 29, 1883. (No model.)

*To all whom it may concern:*

Be it known that I, ELBRIDGE F. HASKELL, a citizen of the United States, residing at Lawrence, in the county of Essex and State of Massachusetts, have invented certain new and useful Improvements in Strainers for Coffee and Tea Pots; and I do hereby declare that the following is a full, clear, and exact description of the same, reference being had to the annexed drawings, making a part of this specification, and to the letters and figures of reference marked thereon.

Figure 1:
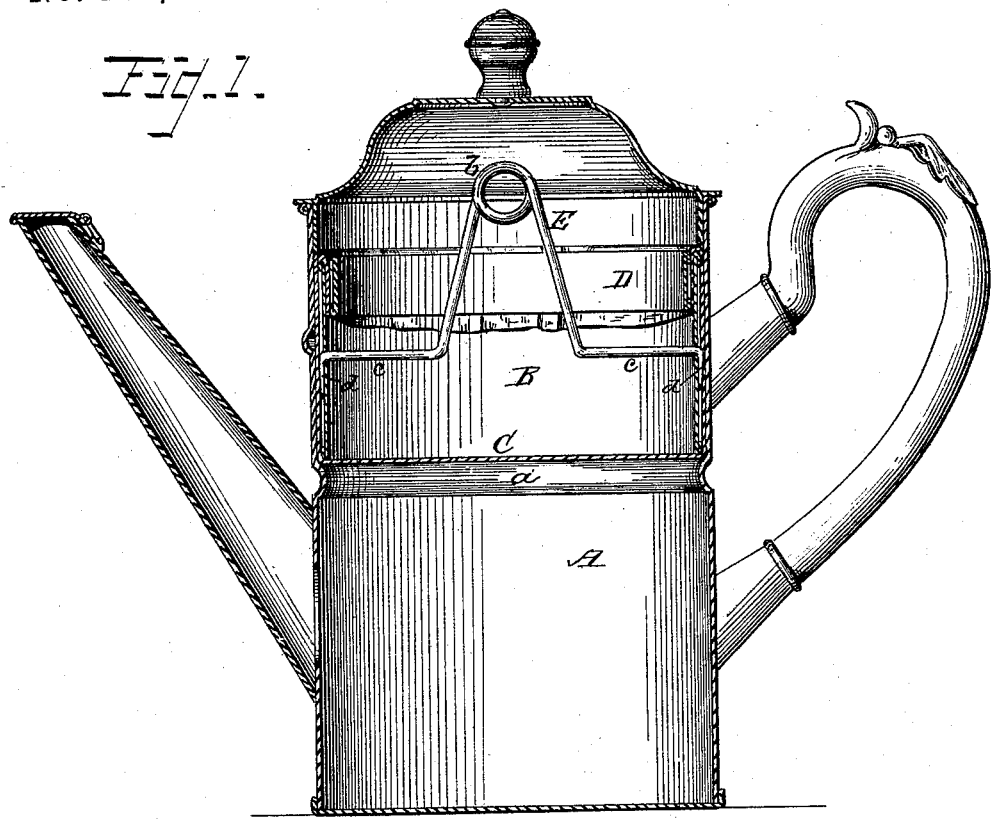
Figure 2:
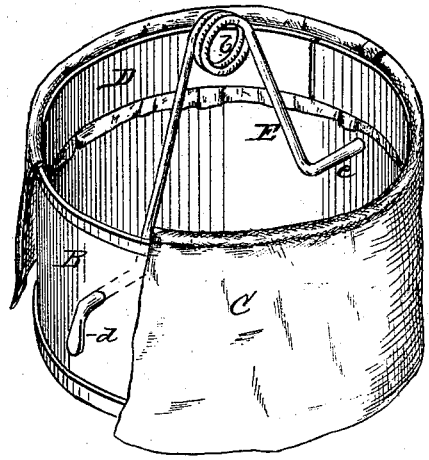

Figure 1 of the drawings is a sectional view of a coffee-pot with my improved strainer attached, and Fig. 2 a perspective view of the strainer with the cloth partly broken away.

The present invention has relation to certain new and useful improvements in that class of strainers for coffee-pots or tea-pots in which are employed a metal frame and means for securing thereto a piece of cloth through which the hot water percolates; and the object of the invention is to provide simple and effective means for securely holding suspended at any height within the coffee or tea pot the strainer and admit of its ready removal when required. These objects I attain by the construction substantially as shown in the drawings and hereinafter described and claimed.

In the accompanying drawings, A represents the coffee or tea pot, as the case may be, and of the usual construction, to which my improved strainer is attached, as shown in Fig. 1.

The strainer consists of the circular sheet-metal frame B, around which is secured the straining-cloth C in the following manner: The cloth is first placed over the bottom of the frame, then up the sides and over the top edge, and next down the interior sides, after which a split spring-band, D, is inserted, thus firmly holding the cloth by binding against it, as well as drawing and keeping it taut.

The several folds of the cloth, as above described, render it less liable to sag or become loose. While the cloth is upon the entire exterior of the frame a packing is formed between it and the interior of the coffee or tea pot, thereby preventing any liquid from passing over the sides of the frame, and making a more perfect and tighter fit in the pot.

If desired, a flange, $a$, may be formed in the interior of the coffee or tea pot to retain the strainer a certain distance above the bottom thereof.

The frame B is provided with a spring-wire, which serves both as a bail to withdraw or insert the strainer in the coffee or tea pot and to hold the strainer in position by the ends of the wire pressing against the interior sides of the pot or hooking over the upper rim thereof. This spring-wire E is constructed in the following manner: by first being bent at or near its middle into one or more coils, $b$, thence downward and outward in a horizontal direction to form arms $c$, which pass through perforations in the frame B diametrically opposite each. At these points, upon the outside of the frame B, the wire is bent downwardly at right angles to form hooks $d$, which are flattened, so that they will present a flat or widened surface to the interior of the coffee or tea pot, and by the force of the spring hold the device of strainer at any height.

In some cases it would be found desirable to suspend the strainer from the top of the coffee or tea pot, and for this reason the hooks $d$ are more especially designed, they hooking over the upper rim or edge of the pot, while as a handle or bail the wire is found very useful.

Having now fully described my invention, what I claim as new, and desire to secure by Letters Patent, is—

1. The spring-wire E, having its ends extending through perforations in the frame B, to hold the strainer within the coffee or tea pot, substantially as and for the purpose described.

2. The combination, with the frame B, strainer-cloth C, and suitable means for securing it thereto, of the spring-wire E, bent to form horizontal arms extending through the frame, and hooks $d$, substantially as and for the purpose specified.

3. The frame B, cloth C, and ring or band D, in combination with the wire E, bent to form coil-spring $b$, arms $c$, and hooks $d$, substantially as and for the purpose set forth.

In testimony that I claim the above I have hereunto subscribed my name in the presence of two witnesses.

ELBRIDGE F. HASKELL.

Witnesses:
CHARLES F. GOURLAY,
ARTHUR YOUNG.